United States Patent [19]

Bridle et al.

[11] Patent Number: 4,618,735

[45] Date of Patent: Oct. 21, 1986

[54] PROCESS AND APPARATUS FOR THE CONVERSION OF SLUDGES

[75] Inventors: Trevor R. Bridle, Burlington; Herbert W. Campbell, Dundas, both of Canada

[73] Assignee: Canadian Patents and Development Limited; Société des Brevets et D'Exploitation Limitie, both of Ottawa, Canada

[21] Appl. No.: 645,149

[22] Filed: Aug. 29, 1984

[30] Foreign Application Priority Data

Sep. 13, 1983 [CA] Canada ............................ 436601

[51] Int. Cl.$^4$ ................................ C07C 1/00
[52] U.S. Cl. .................................. 585/240; 44/61; 48/197 A; 201/2.5; 201/21; 201/25; 201/44; 208/13
[58] Field of Search ............ 585/240; 208/13; 44/61; 201/21, 23, 25, 28, 44; 48/197 A

[56] References Cited

U.S. PATENT DOCUMENTS

| | | | |
|---|---|---|---|
| 1,855,878 | 4/1932 | Conklin | 208/13 |
| 2,036,973 | 4/1936 | Sullivan et al. | 208/13 |
| 2,070,256 | 2/1937 | Carter et al. | 208/13 |
| 2,078,882 | 4/1937 | Savage, Jr. | 208/13 |
| 2,897,054 | 7/1959 | Miley | 208/13 |
| 3,148,227 | 9/1964 | Hearon et al. | 585/240 |
| 3,716,474 | 2/1973 | Hess et al. | 208/13 |
| 4,097,378 | 6/1978 | St. Clair | 208/13 |
| 4,300,915 | 11/1981 | Schmidt et al. | 48/197 A |

*Primary Examiner*—Andrew H. Metz
*Assistant Examiner*—Anthony McFarlane
*Attorney, Agent, or Firm*—Hirons, Rogers & Scott

[57] ABSTRACT

There is disclosed a new process for the conversion of the organic components of sludge, particularly sewage sludge, to produce useful, storable, energy-containing oil products, apparatus for carrying out the process and a control process for optimization of the process temperature. The sludge preferably is mechanically dewatered to about 20-25% solids by weight and thermally dried to about 90% solids by weight. The resultant material is comminuted and heated in the apparatus of the invention to at least 250° C. in a heating zone in the absence of oxygen to generate a gaseous atmosphere containing volatiles; this atmosphere is then removed, scrubbed of $H_2S$ and $NH_3$ if required, and passed preferably in countercurrent flow in a heated reaction zone in intimate contact with the "devolatilized" sludge solids from the heating zone, again in the absence of oxygen, at a temperature of at least 280° C., resulting in catalyzed vapor phase oil-producing reactions. The oil vapors are carried out by the gas flow and condensed. The preferred apparatus moves the sludge solids cocurrent with the heating zone atmosphere and countercurrent with the reaction zone atmosphere. In the reaction zone the conveyor not only moves the comminuted sludge along but lifts it and drops it through the gaseous atmosphere of the preferred intimate contact. Preferably the sludge is examined repeatedly by differential scanning calorimetry to generate a thermogram which has been found to reveal immediately the optimum temperature for operation of the reaction zone, and also the anticipated oil yield from the sludge.

14 Claims, 6 Drawing Figures

PROCESS AND APPARATUS FOR THE CONVERSION OF SLUDGES

FIELD OF THE INVENTION

The present invention is concerned with processes and apparatus for the conversion of sludges, particularly sewage sludge, in order to obtain useful products therefrom, such as liquid fuels.

REVIEW OF THE PRIOR ART

Sewage sludge is an unavoidable by-product of the treatment of sewage and other wastewaters, and roughly one tonne of sludge is generated for each 4,540 cubic metres (1.0 million Imperial gallons) of wastewater treated. Disposal of the sludge is expensive and normally constitutes up to 50% of the total annual costs of wastewater treatment. The major sludge disposal options currently used in North America include agricultural utilization, land-filling and incineration, with disposal costs at this time ranging from about $126.00/tonne for agricultural utilization to over $300.00/tonne for incineration. Wastewater treatment plants therefore currently are designed to minimize sludge production and all efforts are taken to stabilize and reduce its volume prior to disposal or utilization. It is projected that nevertheless sludge production will at least double in the next decade, while the possibility of the imposition of restrictions on agricultural utilization, and an ever-increasing difficulty in licensing disposal sites, indicates the need for alternative solutions, preferably oriented toward utilization of the sludge as a recoverable resource.

Sewage sludge solids comprise a mixture of organic materials (mainly in the biomass) composed mainly of crude proteins, lipids and carbohydrates, and inorganic materials, comprising significant quantities of silt, grit, clay and lower levels of heavy metals. A typical raw sewage sludge comprises about 50–80% volatile material, and contains about 25–40% organic carbon. Numerous sludge processing options have been proposed hitherto and have the potential to convert a fraction of this organic material into usable energy, but only a few have been demonstrated to be viable net energy producers at full scale. Anaerobic digestion of sewage sludge is probably the most common process employed to date, about 25% of the available organic materials being converted to produce a gas rich in methane, resulting in an energy production of about 5 Megajoules per kilogram (MJ/kg) of dry sludge solids fed to the digester. Other alternatives, such as starved air incineration, gasification and liquefaction have recently been reported as viable technologies for net energy production from sewage sludge.

A practical problem with many of the processes proposed and employed hitherto, particularly those involving pyrolysis and incineration, is that the principal usable energy-containing products are gases, often not easily condensable, and of low net energy content, so that they are impossible or uneconomic to store and must be used immediately. Generally it is only practicable to use them to produce relatively low grade energy, such as steam, and flare them to waste during periods of little or no demand. There is a growing demand for processes that result in storable (liquid or liquifiable), transportable and if possible upgradable energy-containing products, such as synthetic oils, with efforts directed to the optimum production of net storable energy, and with the non-storable products, if used at all, used in the operation of the process.

An example of starved air incineration is the Hyperion Energy Recovery System disclosed by R. T. Haug and H. M. Sizemore at the E.P.A. International Conference on Thermal Conversion of Municipal Sludge, Hartford, Conn. U.S.A. in March, 1983 and currently being installed at Los Angeles, Calif. U.S.A. This system comprises digestion of the sludge, subsequent dewatering, Carver-Greenfield dehydration and thereafter starved air fluid bed incineration of the sludge derived fuel. A total of 25 MW of electricity will be generated per day from the processing of 366 tonnes of dry sludge, with 18 MW being the net energy from the process. This is equivalent to a net energy production of 4.2 MJ/kg of dry sludge.

A thermal gasification system has been proposed by S. A. Virgil and G. Tchobanoglous in a paper entitled, "Thermal Gasification of Densified Sewage Sludge and Solid Waste", presented at the 53rd Annual Water Pollution Control Federation (WPCF) Conference at Las Vegas, Nev. U.S.A. in October 1980, while a laboratory scale system for liquefaction was disclosed at the above-mentioned Hartford Conference in a paper by P. M. Molton entitled, "Batelle Northwest Sewage to Fuel Oil Conversion", consisting of alkaline pretreatment of the sludge and subsequent autoclaving at 320° C. for one hour at about 10,000 kPa under an argon atmosphere. This last process produces oil, asphalt and char with reported oil yields of up to 15% by weight of total sludge solids, total thermal efficiency of up to 70%, and net energy production of about 5.9 MJ/kg, the latter figure being based on the assumption that the oil represents the net energy.

In another process described by W. L. Kranich, K. Guruz and A. H. Weiss in a paper entitled, "Hydroliquefaction of Sewage Sludge", published in the Proceedings of the National Conference on Municipal and Industrial Sludge Utilization and Disposal", Washington, D.C., U.S.A. May 1980, both raw and digested dry sludge were processed with a carrier oil in an autoclave at temperatures ranging from 396°–420° C. under hydrogen at 10,000–13,000 kPa. Oils and asphaltenes were produced, with oil yields of up to 30%.

A process for the conversion of sewage sludge to produce oils has been disclosed in European Patent Application No. 81109604.9, filed Nov. 10th 1981 by Prof. Dr. Ernst Bayer and published May 26th 1982 (Pub. No. AZ 0 052 334), and has been described by E. Bayer and M. Kutubuddin of Tubingen University, Federal Republic of Germany, in several articles, for example, in "Öl aus Mull and Schlamm" at pages 68–77 of Bild der Wissenschaft, Issue 9(1981); in " 1 aus Klarschlamm" at pages 377–381 of Abwasser, Issue 29(1982); and in "Low Temperature Conversion of Sludge and Water to Oil" in the Proceedings of the International Recycling Congress, 1982, Berlin, Federal Republic of Germany. The process has been demonstrated on both batch and continuous laboratory scale systems, and basically comprises heating dried sludge slowly with the exclusion of air to a conversion temperature of 280°–600° C. for about 30–180 minutes, the vapours being condensed to generate a crude oil and the solid residue being coal-like. Significant advantages of the process are stated to be that it can be operated at only slightly above atmospheric pressure and no additives are required, the developers postulating that catalysed vapour phase reactions occur in which the organic materials are converted to straight chain hydrocarbons, much like those present in crude oil. Analysis of the product is stated to confirm that aliphatic hydrocarbons are present in contrast to other known oil-producing processes, which appear to tend to produce aromatic and cyclic compounds, whether utilizing sludge, cellulose or refuse as the substrate. The developers state that they have demonstrated oil yields ranging from 18–27% and char yields from 50–60%, the oil having a heating value of about 39 MJ/kg and the char of about 15 MJ/kg. Energy balance calculations indicate that the process is a net producer of energy, provided that the sludge is first mechanically dewatered to about 20% solids, and it has been estimated that a net energy production of 10–15 MJ/kg solids could be obtained in a full scale process.

This Bayer process is simple and in effect, mimics the natural process of oil synthesis. It is known that natural crude oil was formed from microscopic organisms over geologic periods of time, and comprises a mixture of saturated and unsaturated hydrocarbons including some non-hydrocarbon material. It is postulated by Bayer that at the low levels of energy input used, with the exclusion of oxygen, the proteins and lipids in the sludge are converted to oil and the carbohydrates to the coal-like material, the process being catalysed if necessary by the addition of suitable materials. It is stated that in the case of sewage sludge it is in most cases superfluous to add a catalyst material, since the inorganic components present in the sludge contain a sufficient amount of catalyst in the form of silicates, aluminum compounds and transition metals. The heterobonds (C—S, C—N, C—P, C—O) are broken, but not the C—C bonds, resulting in a hydrocarbon mix very similar to natural crude oil. The research indicated that the maximum oil yield was achieved at an operating temperature of 280° C. to 320° C.

In a solid waste treatment process disclosed in U.S. Pat. No. 3,714,038, issued Jan. 30, 1973 to the Black Clawson Company, a slurry is formed of a mixture of the organic and inorganic wastes and the inorganic materials are then removed. The slurry is dewatered and pyrolyzed or hydrogenated to result in a series of products such as gas, oil, char and residue.

U.S. Pat. No. 3,962,044, issued June 8, 1976 to the Regents of the University of California, proposes a process for the treatment of solid animal and human excreta by particulating and heating it in a closed heating zone at 200°–1000° C. (300°–600° C. preferred) for a period of 15–120 minutes, when a part is volatilized and the solid residue is carbonized. The volatilized portion is removed to a recovery zone and condensables are condensed therefrom, it being separated into aqueous, non-aqueous and non-condensable fractions.

U.S. Pat. No. 4,030,981, issued June 21, 1977 to H. V. Hess, W. F. Frang and E. L. Cole, describes processes for making low sulphur oil by coking wastes, one of which is sewage sludge, at temperatures of 400°–550° F., pressures of 300–3000 p.s.i.g., and times of 5 minutes to 2 hours and thereafter reacting the coked waste with hot pressurized synthesis gas (carbon monoxide and hydrogen), the synthesis gas reaction employing temperatures of 500°–750° F. and pressures of 500–5000 p.s.i.g.

U.S. Pat. No. 4,098,649, issued July 4, 1978 to Redken-Young Processes Inc. describes a process for destructive distillation of organic material separated, for example by flotation, from industrial and municipal wastes in which the material is delivered to a screw extruder conveyor which is heated to different temperatures in succeeding zones along its length, for example 40°–600° F. in a first zone and up to 1500° F. in subsequent zones, the resultant char being discharged. The gaseous products are removed separately from the different zones and separated, and may include olefins and paraffins.

U.S. Pat. No. 4,210,491 issued July 1, 1980 to Tosco Corporation also proposes the use of a screw conveyor as a retort for converting substances containing organic material into hydrocarbon vapours and solid residue, the volatile materials being removed at different points along its length and subsequently processed. The retort conveyor is heated by a fluidised bed.

U.S. Pat. No. 4,344,770 issued Aug. 17, 1982 to Wilwardco Inc. discloses a process and apparatus intended principally for the hydrolysis treatment of sawdust and wood chips, but applicable also to sewage sludge. The separated gases are condensed to liquid and gas phases and the liquid phase is then separated by gravity into water and oil fractions. The water fraction is distilled to separate water soluble oils and they are added to the oil fraction to increase its energy content.

Canadian Pat. No. 1,075,003, issued Apr. 8, 1980 to Karl Klener describes a process for the production of combustible gas from waste materials, including sewage sludge, requiring drying of the material, its carbonization at low temperature (300°–600° C.) in a first series of rotary tubes, separation of the resultant combustion components and conversion of the low temperature carbonization gases in a reaction bed of solid carbon at high temperature (1000° to 1200° C.).

Canadian Pat. No. 1,100,817, issued May 12, 1981 to Ahlstrom (A.) Osakeyhtiz discloses a method of treating material, such as sewage sludge, in a fluidized bed reactor for its incineration, the process employing mechanical dewatering to achieve a high enough solids content for the process to be autogenous and not to require supply of auxiliary fuel. It is not always possible to remove sufficient water mechanically and the thus-dried material is fed first into a pre-reactor into which is passed hot separated solids removed from the flue gases from the main fluidised bed reactor, these hot solids being mixed thoroughly with the sludge in the pre-reactor to heat and dry it before it passes to the main reactor.

Canadian Pat. No. 1,001,493, issued Dec. 14th 1976 to Phillips Petroleum Company, U.S.A. discloses a two-stage incinerator for waste products, such as sewage sludges. In the first stage vaporisation or volatilization is achieved with some combustion occuring, and then all the gaseous products are conducted to a second stage in which further oxidation and combustion occurs, the hot flue gases from the second stage being quenched with cool air to provide preheated air for the combustion in either or both of the two stages.

DEFINITION OF THE INVENTION

It is the principal object of the invention to provide a new process and apparatus for the conversion of sludges, particularly sewage sludges, by heating and chemical reaction, in order to obtain useful storable products therefrom, such as oils.

It is another object to provide a method for the testing and controlling of such a process for optimum production of the useful products.

In accordance with the present invention there is provided a process for the conversion of sludge, particularly sewage sludge, comprising the steps of:

(a) heating dried sludge in a heating zone in the absence of oxygen to a temperature of at least 250° C. for the volatilization of oil producing organic materials therein, resulting in heating zone gaseous products and sludge residue;

(b) removing the said gaseous product from the heating zone;

(c) thereafter contacting heated sludge residue from step (a) in a reaction zone with the removed heating zone gaseous products in the absence of oxygen at a temperature of from 280° C. to 600° C. for repeated intimate gas/solid contact at temperature sufficient to cause gas/solid contact, oil producing reactions to occur within the heating zone gaseous products catalysed by the heated sludge residue resulting in reaction zone gaseous products containing condensable oil products;

(d) removing the reaction zone gaseous products of step (c) from the reaction zone and separating at least the condensable oil products therefrom.

Also in accordance with the invention there is provided apparatus for the conversion of sludge comprising:

an enclosure establishing a heated heating zone having an inlet thereto for dried sewage sludge and separate outlets therefrom for heating zone gaseous products and residual heating zone solid products;

conveyor means within the heating zone enclosure for conveying solid products from its inlet to its solid products outlet;

an enclosure establishing a heated reaction zone having separate inlets thereto for gaseous and solid products and separate outlets therefrom for gaseous and solid products;

conveyor means within the reaction zone enclosure for conveying solid products from its solid products inlet to its solid products outlet;

the heating zone solid products outlet being connected to the reaction zone solid products inlet for the passage of solid products between them; and duct means connecting the heating zone gaseous products outlet to the reaction zone gaseous products inlet.

Preferably, the said duct means connect the heating zone gaseous products outlet to the reaction zone gaseous products inlet adjacent to the reaction zone solid products outlet while the reaction zone gaseous products outlet is adjacent to the reaction zone solid products inlet so that the gaseous products move in the reaction zone countercurrent to movement of the solid products therein.

Further in accordance with the invention there is provided a process for the optimisation of the production of oil products from the treatment of sludge including the steps of:

(a) heating dried sludge residue and the volatiles obtained from the sludge in a reaction zone in the absence of oxygen to a temperature of from 280° C. to 600° C. for the establishment of catalysed vapour phase, oil-producing reactions of vaporised sludge components in the presence of the solid sludge residue catalyst components;

(b) testing sample of the sewage sludge by differential scanning calorimetry and producing as a result of the test a thermogram indicating the temperature range of the exothermic reaction characteristic of the production of oil products by the process;

(c) determining from the thermogram the optimum temperature for the maximum yield of oil products from the exothermic reaction; and (d) adjusting the average temperature of the reaction zone to be equal to the thus determined optimum temperature for oil products production.

Such an optimisation process for continuous operation with a sludge of variable components may include the further steps of (e) testing the sludge at intervals of time by application of steps (b) and (c), and (f) adjusting the average temperature of the reaction in accordance with step (d), the said intervals of time being frequent enough to maintain the average temperature at or close to the optimum temperature for the variable composition sludge.

BRIEF DESCRIPTION OF THE DRAWINGS

Processes and apparatus which are particular preferred embodiments of the invention will now be described, by way of example, with reference to the accompanying drawings, wherein:

FIG. 1A is an end view of a screw conveyor member 14 of a conveyor in the apparatus of FIG. 1;

DESCRIPTION OF THE PREFERRED EMBODIMENTS

The raw sewage sludges employed in the determination of process data, using the continuous and batch-type apparatus of FIGS. 1, 3 and 4, which will be described below, contained a mixture of primary and waste activated sludges (WAS) and were obtained from the primary clarifiers of the respective sewage treatment plants. All the sludges initially contained 2–4% solids by weight and were oven dried at about 70° C. to about 90–95% solids, ground to a particle size of less than 0.85 mm, composited, and then stored in air tight containers. Analyses for these sludges are shown in Columns B to D of TABLE 1 and indicate that they are similar in composition, with values normal for a medium to heavily industrialized municipal sewage sludge. Column A shows the range of values obtained upon analysis of typical raw sewage sludges. The invention is however, generally applicable to sludges as long as they contain organic components that are convertible to oils under the conditions of the process, such as those obtained from segregated municipal refuse.

TABLE 1

| COMPONENT | A | B | C | D |
|---|---|---|---|---|
| Volatile Solids | 60–90 | 60.3 | 60.5 | 63.6 |
| Total Organic Carbon | 25–40 | 33.28 | 34.44 | 36.34 |
| Protein | 20–30 | n/a | n/a | n/a |
| Lipids (fats) | 10–30 | n/a | n/a | n/a |
| Carbohydrates | 10–20 | n/a— | n/a | n/a |
| Hydrogen | n/a | 4.91 | 5.17 | 5.31 |
| Nitrogen | 3–12 | 3.44 | 3.15 | 3.63 |
| Phosphorus | 1–3 | n/a | n/a | n/a |
| Potassium | 0.1–0.5 | n/a | n/a | n/a |
| Sulphur | n/a | 0.78 | 0.96 | 0.68 |
| Oxygen | n/a | 25.41 | 24.97 | 28.95 |
| Aluminum | 0.1–3 | n/a | 1.2 | 2.0 |
| Iron | 2–6 | n/a | 4.3 | 6.4 |
| Calcium | 1–8 | n/a | 3.1 | 1.2 |
| Zinc (ug/g) | 500–10000 | 970 | 2416 | 1299 |
| Copper (ug/g) | 250–5000 | 863 | 655 | 668 |
| Chromium (ug/g) | 50–10000 | 1260 | 1260 | 129 |
| Cadmium (ug/g) | 5–500 | n/a | 8.7 | 46 |
| Nickel (ug/g) | n/a | 63 | 222 | 12 |
| Calorific Value(MJ/kg) | 13–20 | 16.0 | 17.5 | 17.8 | n/a = not measured or not available
Values are expressed as % on a dry weight basis, unless otherwise indicated, e.g. for the metals.

Figure 1:
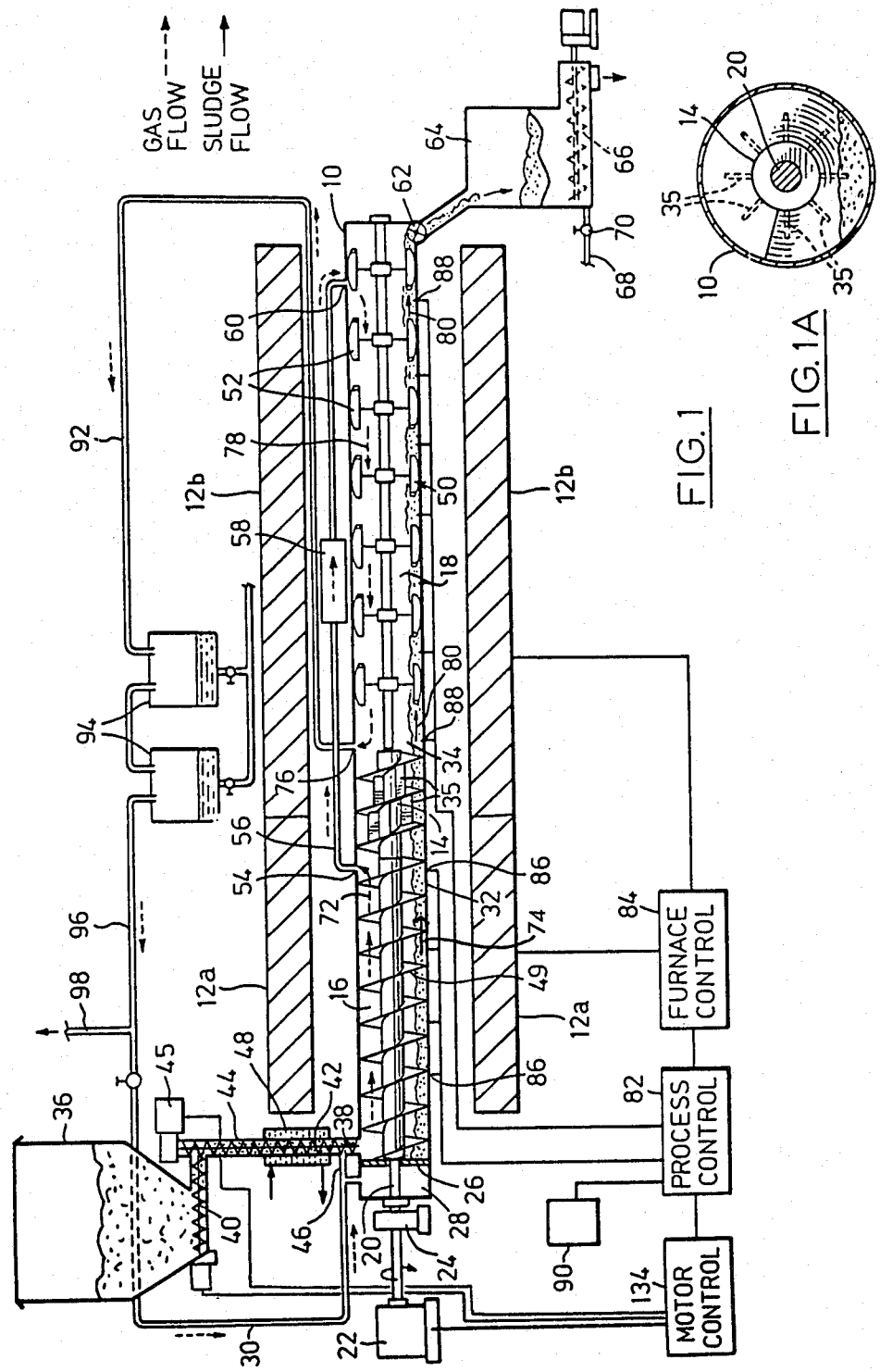
FIG. 1 is a partly schematic, partly diagrammatic longitudinal cross-section through apparatus of the invention for operating a continuous process of the invention.
Figure 2:
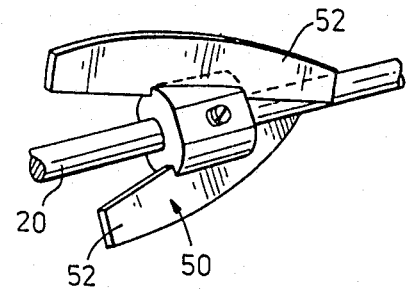
FIG. 2 is a perspective view of a lifting/conveying blade assembly for a conveyor employed in the apparatus of FIG. 1.

Continuously-operating apparatus in accordance with the invention shown in FIGS. 1 and 2 consists of an elongated stationary tube enclosure 10 surrounded by a two-section furnace 12a and 12b and having its interior divided by a baffled helical screw conveyor member 14 into a shorter heating zone 16 and a following longer reaction zone 18. A conveyor shaft 20 on which the member 14 is mounted extends the full length of the tube and is mounted for rotation therein about a longitudinal axis coaxial with the longitudinal axis of the tube 10, the shaft being driven by a variable speed motor 22 via a speed reducer 24. The shaft passes through a seal 26 and seal chamber 28, the latter being supplied with gas under pressure from a pipe 30 to prevent escape of gas from the heat zone 16. The conveyor member 14 is operative to convey solid material from the respective outlet 32 from the heating zone to the inlet 34 of the reaction zone, and is provided with a plurality of partial longitudinal baffles 35 that will permit the screw to convey the solid material in the usual manner, while preventing any substantial passage of gaseous products from solids outlet 32 to solids inlet 34, other than by unavoidable pumping and leakage. Thus, each partial baffle 35 extends between the two immediately adjacent screw flights radially outwards from their roots and partway towards the flight radially outermost edges so as to leave a respective radially outer space that is closed by the solid material into which the baffle edge penetrates. A minimum quality of solid material must therefore be present for the seal to be effective.

The dried comminuted sludge is deposited in a feed hopper 36 and is conveyed therefrom to a heating zone inlet 38 by a horizontal screw conveyor 40 to a vertical pipe 44 containing a screw conveyor 42 operated by a controllable speed motor 45. The pipe 44 and the heating zone may be purged with gas supplied by pipe 46 to exclude oxygen, the pipe 44 also being cooled by a heat exchanger 48 through which it passes. The portion of the conveyor shaft 20 within the heating zone carries a respective section 49 of a helical screw conveyor, while the portion of the shaft within the reaction zone has mounted thereon at spaced intervals along its length a plurality of blade assemblies 50 of special form, shown in more detail in FIG. 2, each assembly consisting of a plurality of axially-extending blades 52 shaped and angled to not only move the comminuted solid material along the tube, but also to lift the material upwards and then allow it to drop from the blades under gravity to the bottom of the tube. In the heating zone 16 the pyrolising solid material, at least at the inlet end, has the form of a paste and must be positively moved through the tube, while in the reaction zone 18 the material has the form of a relatively free-flowing char and this special form of the conveyor provides increased opportunity for mutual intimate contact between the comminuted solid material and the gaseous atmosphere of the zone to facilitate the vapour-phase exothermic self-catalysed reactions that are taking place. It will be understood by those skilled in the art that in the context of this specification the term "gaseous atmosphere" is employed for the two zones to avoid the need for more cumbersome terminology, but such an atmosphere will also include vapours.

The heating zone enclosure formed by the tube 10 is heated by the adjacent furnace section 12a to a temperature of about 250° C., at which the remaining 5–10% water vapour and volatiles are driven off and pass to an outlet 54, from which the gaseous product is led by a pipe 56 through a gas conditioning chamber 58 to an inlet 60 at the far end of the reaction zone enclosure. The conditioning chamber will be used, for example, for the removal of unwanted sulphur and nitrogen occuring in the form of easily-scrubbable hydrogen sulphide and ammonia. Meanwhile the conveyor screw member 14 feeds the sludge residue solid material from the heating zone to the reaction zone, where it is engaged by the respective blade assemblies 50 and moved in the manner described above along the length of the zone until it is finally discharged through a gas seal star valve 62 into a sealed char storage bin 64, from which it is removed as required by a conveyor 66. The interior of the char storage bin can be purged as required by injecting purge gas through pipe 68 and valve 70.

The directions of movement in the heating zone of the gaseous and solid products are indicated respectively by the arrows 72 and 74, and it will be seen that they move cocurrently relative to one another. An outlet 76 from the reaction zone for the reacted gaseous product is located close to the solids inlet 34. The directions of movement in the reaction zone of the gaseous and solid products are indicated respectively by the arrows 78 and 80 and it will be seen that they move countercurrent relative to one another. The furnace sections are controlled by a process controller 82 via a furnace control 84 to raise and maintain the respective zones to the required temperatures, that for the reaction zone being determined by a process to be described in detail below. The temperatures of the two zones are measured by respective thermocouples 86 and 88 and recorded on a recorder 90 connected to the controller 82.

The gaseous products exiting from the outlet 76 pass via pipe 92 to condensers 94 in which resultant condensed liquid, consisting of oil and pyrolytic water, accumulate and can be withdrawn as required for subsequent separation. The non-condensable gases pass via outlet pipe 96 to an exhaust pipe 98, and can be recycled as required to the conveyor and heating zone to act as purge and seal gases. The combustible non-condensable gases can be used in the operation of the furnace 12a, 12b or elsewhere (e.g. drying the sludge) to render the process as autogenic as possible.

Although in the apparatus described the operation in the reaction zone is by countercurrent movement of the gaseous product and solid material, and this is the preferred mode of operation, the movement can instead be cocurrent, as in the heating zone.

Process Operation

The following is suggested by us as a possible explanation of the operation of the process of the invention, without limitation or guarantee as to the actual mechanism involved. The heating of a dried sewage sludge causes the initial production of water vapour and thereafter of substantial volumes of other gaseous products, and we believe that evolution of these other products will commence at temperatures well below the minimum specified herein for the heating zone of at least 250° C. These gaseous products separate rapidly from the remainder of the sludge with consequent reduced opportunity of subsequent physical contact and chemical reaction with the sludge residue. Moreover, the separation of the gaseous products from the sludge residue involves heat loss to the residue which delays increase in its temperature, so that it takes a correspondingly increased time from commencement of the heating to reach the temperature of at least 280° C. specified for the reaction zone, which minimum temperature is believed necessary for it to become sufficiently effective in promoting the desired oil-producing reactions which result from intimate contact between the residue and the gaseous products. Once the volatilisation in the heating zone has taken place, the heat supplied will be more effective in raising the sludge residue to the required temperature. The sludge residue in the reaction zone is in a dried divided (or readily dividable) form upon mechanical agitation, in which form intimate contact between itself and gaseous products is easier to achieve than would be possible with the more pasty form that obtains in the heating zone. Upon supply of the volatile material removed from the heating zone to the reaction zone and contact with the heated sludge residue, improved conditions exist for the oil-producing reactions to take place. It will also be seen that greater flexibility exists for the establishment of a continuously operating process in that the conditions that obtain in the two zones can differ from one another and can be varied independently, and that the volatile material can be contacted with heated sludge residue of another volatilisation, for example, when the volatile material is processed between its removal from the heating zone and feeding to the reaction zone.

Prior to the operation of the continuous process apparatus of FIG. 1 a batch reaction apparatus was used to generate process data and is shown schematically in FIG. 3; data obtained from this apparatus is set out in Table 2 below, while corresponding data obtained from operation of the apparatus of FIG. 1 is set out in Table 5.

Figure 3:
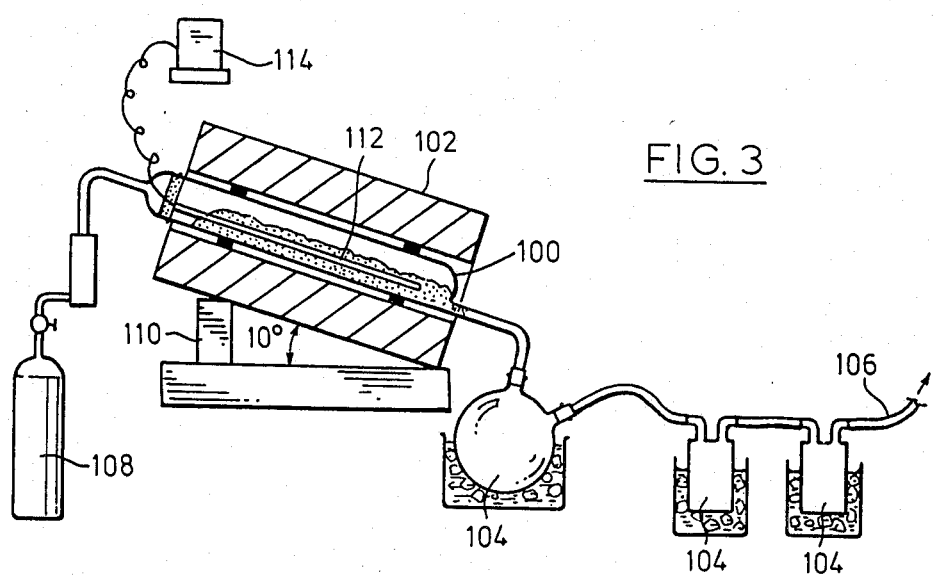
FIG. 3 is a schematic elevation of a batch-type laboratory apparatus used for the production of process data.

Referring now to FIG. 3, a single reactor provides both heating and reaction zones and consists of a pyrex tube 100 of 70 mm diameter and 720 mm length. This was heated in a furnace 102, off-gasses being condensed in a trapping system consisting of three series-connected flasks 104, using ice as the coolant. Non-condensable gases (NCG) were vented by pipe 106 from the system to a furnace hood and not collected. A typical run was conducted by charging 550 g of dried sludge (93-96% solids) into the reactor and deaerating with nitrogen from a supply 108 while in the vertical position. The reactor volumetric packing for all runs was a nominal 50%. The reactor was then placed in the furnace, which was inclined by a support 110 at 10° to facilitate liquid transport. All the lines, traps, etc. were connected and the entire system purged with nitrogen (15 mL/s) for 20 to 30 minutes. The furnace was then switched on and brought up to operating temperature at a controlled rate, the control employing a thermocouple 112 placed in the sludge bed and connected to thermocouple switch and readout 114. Once operating temperature had been reached, the nitrogen purge rate was reduced to 7 mL/s. When all visible signs of reaction, i.e., gas-/oil flow, ceased the heat was switched off and the nitrogen purge rate increased to 15 mL/s for approximately 30 minutes. The system was dismantled and the char, oil and pyrolytic water collected and stored for analysis, oil/water separation being achieved using a separatory funnel.

Process Performance

The operating conditions and results are shown in Table 2 below, while typical elemental analyses of the resultant oils and chars are shown in Table 3 and a distribution analysis of aliphatic hydrocarbons found in an oil is shown in Table 4. All the data in the tables is expressed on the basis of dry sludge corrected for the normal 4-7% moisture usually present, and the calorific values are expressed on a total solids basis (not corrected for volatiles). The non-condensable gas (NCG) yield was calculated by difference. Analysis of the NCG, by GC, indicated that it contained roughly 6% methane and 10% carbon monoxide with the remainder comprising mostly carbon dioxide and nitrogen. The calculated calorific value is approximately 2.0 MJ/kg of NCG.

Most of the test runs were conducted at optimum conditions defined as:

optimum conversion temperature as determined by differential scanning calorimetry;

linear increase of temperature with time to operating temperature at 10° C./minute; and continuous nitrogen purge.

Runs 11, 12, 13, 22, 23, 24 and 19 instead were conducted with one variable altered during each test, as indicated in Table 2.

TABLE 2

BATCH REACTOR RESULTS

| | | OPERATING CONDITIONS | | RESULTS | | | | | | |
|---|---|---|---|---|---|---|---|---|---|---|
| | | | | OIL | | | CHAR | | NonCondensable | Pyrolytic |
| Run No. | Sludge | Temp (°C.) | Other Comments | Yield (%) | Cal. Value (MJ/kg) | Viscosity+ (centistokes) | Yield (%) | Cal. Value (MJ/kg) | Yield (%) | Water Yield (%) | Thermal Efficiency (%) |
| 1,20,29 | C | 400 | Optimum | 20.8 | 36.40 | Solid | 59.5 | 9.86 | 11.6 | 8.1 | 81.9 |
| 5-10 | D | 450 | Optimum | 21.1 | 37.43 | 31.1 | 52.5 | 10.68 | 13.2 | 13.1 | 77.7 |
| 14,15,16 | B | 450 | Optimum | 24.1 | 33.13 | 60.5 | 53.7 | 10.08 | 13.3 | 8.8 | 83.2 |
| 2 | C | 425 | 63% WAS | 25.8 | 33.83 | 70.3 | 57.1 | 11.35 | 12.2 | 4.9 | 87.2 |
| 3 | C | 425 | 75% WAS | 28.6 | 34.13 | 97.5 | 56.7 | 11.63 | 10.1 | 4.6 | 90.8 |

TABLE 2-continued

BATCH REACTOR RESULTS

| | | OPERATING CONDITIONS | | RESULTS | | | | | | |
|---|---|---|---|---|---|---|---|---|---|---|
| | | | | OIL | | | CHAR | | NonCon-densable | Pyrolytic Water | Thermal |
| Run No. | Sludge | Temp (°C.) | Other Comments | Yield (%) | Cal. Value (MJ/kg) | Viscosity+ (centi-stokes) | Yield (%) | Cal. Value (MJ/kg) | Yield (%) | Yield (%) | Efficiency (%) |
| 4 | C | 425 | 88% WAS | 28.7 | 31.77 | 214.0 | 54.6 | 10.65 | 8.9 | 7.8 | 82.4 |
| 11,12,13 | B | 350 | Low temperature | 12.8 | 33.32 | Solid | 65.6 | 12.00 | 10.3 | 11.2 | 79.3 |
| 22 | C | 450 | High temperature | 22.3 | 38.87 | Solid | 54.6 | 9.39 | 12.1 | 11.0 | 80.4 |
| 23 | C | 400 | No N$_2$ purge during run | 19.8 | 38.00 | 44.9 | 59.1 | 10.51 | 12.2 | 8.9 | 80.1 |
| 24 | C | 400 | Ramp at 5° C./min. | 16.3 | 37.92 | Solid | 62.7 | 11.24 | 10.3 | 10.7 | 76.9 |
| 19 | C | 400 | 10000 ppm Ni spike | 20.9 | 33.98 | 63.4 | 60.8 | NA | 10.6 | 7.7 | 88.7 |
| 31 | C | 400 | Second reactor, empty | 19.0 | 37.49 | Solid | 60.0 | 11.07 | 12.0 | 9.0 | 80.1 |
| 32 | C | 400 | Second reactor, char | 17.2 | 38.18 | 39.5 | 59.9 | 11.07 | 13.0 | 9.9 | 77.0 |
| 33 | C | 400 | Second reactor, catalyst | 19.0 | 37.49 | 31.0 | 56.8 | 10.01 | 14.8 | 9.4 | 75.0 |

NA = Not Available
°Solid defined as 214 centistokes
+Measured at room temperature (20-25° C.) of Table 5 measurement at 38° C. (ASTM standard)

TABLE 3

OIL AND CHAR ELEMENTAL ANALYSIS (%)

| Run No. | OIL | | | | | CHAR | | | | |
|---|---|---|---|---|---|---|---|---|---|---|
| | C | H | N | S | O | C | H | N | S | O |
| 20 | 78.00 | 10.10 | 3.99 | 0.75 | 6.18 | 25.45 | 1.97 | 2.79 | 1.39 | 11.90 |
| 9 | 78.74 | 10.17 | 3.45 | 0.41 | 6.37 | 26.02 | 1.61 | 3.01 | 1.16 | 12.70 |
| 15 | 77.39 | 9.70 | 4.95 | 0.83 | 6.90 | 24.53 | 1.22 | 2.84 | 0.74 | 9.26 |
| 22 | 77.92 | 10.20 | 3.99 | 0.61 | 6.51 | 22.53 | 1.34 | 2.54 | 1.52 | 12.54 |
| 23 | 78.00 | 10.30 | 3.42 | 0.74 | 7.00 | 23.83 | 1.70 | 2.59 | 1.44 | 11.55 |
| 24 | 77.91 | 10.44 | 3.87 | 0.74 | 6.48 | 24.76 | 1.85 | 2.83 | 1.33 | 12.37 |
| 19 | 79.07 | 10.06 | 4.66 | 0.53 | 7.07 | 23.36 | 1.56 | 2.76 | 1.48 | 13.25 |
| 31 | 76.92 | 10.15 | 4.11 | 0.65 | 6.89 | 26.53 | 2.13 | 2.80 | 1.31 | 11.94 |
| 32 | 79.76 | 10.25 | 4.19 | 0.56 | 5.84 | 25.97 | 1.98 | 2.80 | 1.34 | 11.63 |
| 33 | 79.30 | 10.41 | 3.49 | 0.34 | 5.84 | 24.22 | 1.62 | 2.74 | 1.50 | 11.35 |

TABLE 4

ALIPHATIC HYDROCARBON DISTRIBUTION IN OIL

| Compound | % |
|---|---|
| $C_{10}$ | 8 |
| $C_{10-15}$ | 30 |
| $C_{15-16}$ | 6 |
| $C_{16-17}$ | 5 |
| $C_{17-19}$ | 10 |
| $C_{19-20}$ | 10 |
| $C_{20-21}$ | 10 |
| $C_{21}$ | 21 |
| | 100 |

Results with Different Sludges

Sewage sludges from three separate sources were tested, and the average results achieved for these sludges under optimum conditions are shown at the top of Table 2. The data for locations B and C is the average of 3 runs, whereas the data for location D is the average of six runs. As can the seen, each of these sludges are amenable to conversion, with oil yields ranging from 20.8 to 24.1% and thermal efficiencies ranging from 77.7 to 83.2%. As employed herein thermal efficiency is defined as the energy recovered in the oil, char and NCG as a percentage of that theoretically available in the sludge. The average calorific value of the oil generated varied from 33.13 to 37.43 MJ/kg and for the char, from 9.86 to 10.68 MJ/kg. The viscosity of the oils generated appeared to be specific for the sludges from which they originated. These variations in performance most likely reflect variations in sludge quality from site to site.

Effect of Primary/WAS Sludge Ratio

Most raw mixed sewage sludges contain primary and waste activated sludge (WAS) in roughly a 50/50 mix. The data in Table 2 (Runs 2, 3, 4) indicate that increasing the WAS content, and consequently increasing the bacteria proportion, increases the oil yield. Thus, it can be seen that increasing the WAS proportion from 50% (Runs 1, 20, 29) to 88% (Run 4) resulted in a concomitant increase in oil yield from 20.8 to 28.7%. It is possible however that at 88% WAS content a lower limit catalytic condition was reached since most of the inorganics, which act as the catalyst, are present in the primary sludge. This is evidenced by a reduction in thermal efficiency from a maximum of 90.8% at 75% WAS content (Run 3), to 82.4% at 88% WAS content (Run 4).

Effect of Operating Temperature

Operating temperature is found to have a pronounced effect on oil yield and processing at a temperature significantly below the optimum (Runs 11, 12, 13 compared to Runs 14, 15, 16) reduced oil yield from 24.1 to 12.8% with a concomitant decrease in thermal efficiency. However, operating at temperatures above optimum did not appear to significantly affect oil yield or thermal efficiency (Run 22 compared to Runs 1, 20, 29).

As far as we are at present aware, no full scale oil-from-sludge systems are operating and therefore the only method available prior to the present invention to determine optimum conversion temperature was by conducting repetitive experimental laboratory test runs. This approach obviously is time consuming and expensive for determining optimum conditions at full scale, especially since it is found that sludges vary significantly in their characteristics and the optimum conversion temperature is likely to vary with time, at least on a daily basis. Thus, for cost effective operation at full scale, a precise, fast and relatively inexpensive method to determine optimum conversion temperature is mandatory.

As described in a letter by T. R. Bridle, entitled "Sludge Derived Oil: Wastewater Treatment Implications", published in Science and Technology Letters, April 1982, studies aimed at the characterization of sewage sludge via thermal analysis generated data showing that 280°-320° C. appeared to be an optimum temperature range for oil production. Examination of sewage sludge with a differential scanning calorimeter (DSC) under inert conditions generated a major exotherm in this temperature range, which was attributed to protein decomposition. It was apparent from this DSC generated data that with the experiments involved, protein decomposition and perhaps oil production, was maximized between 280° and 320° C.

Figure 4:
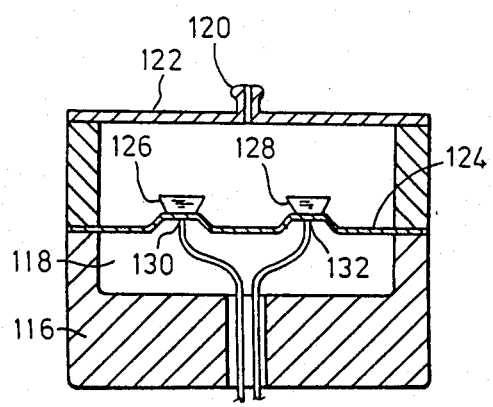
FIG. 4 is a partial cross-section through a differential scanning calorimeter cell used in the determination of the optimum process control temperature.
Figure 5:
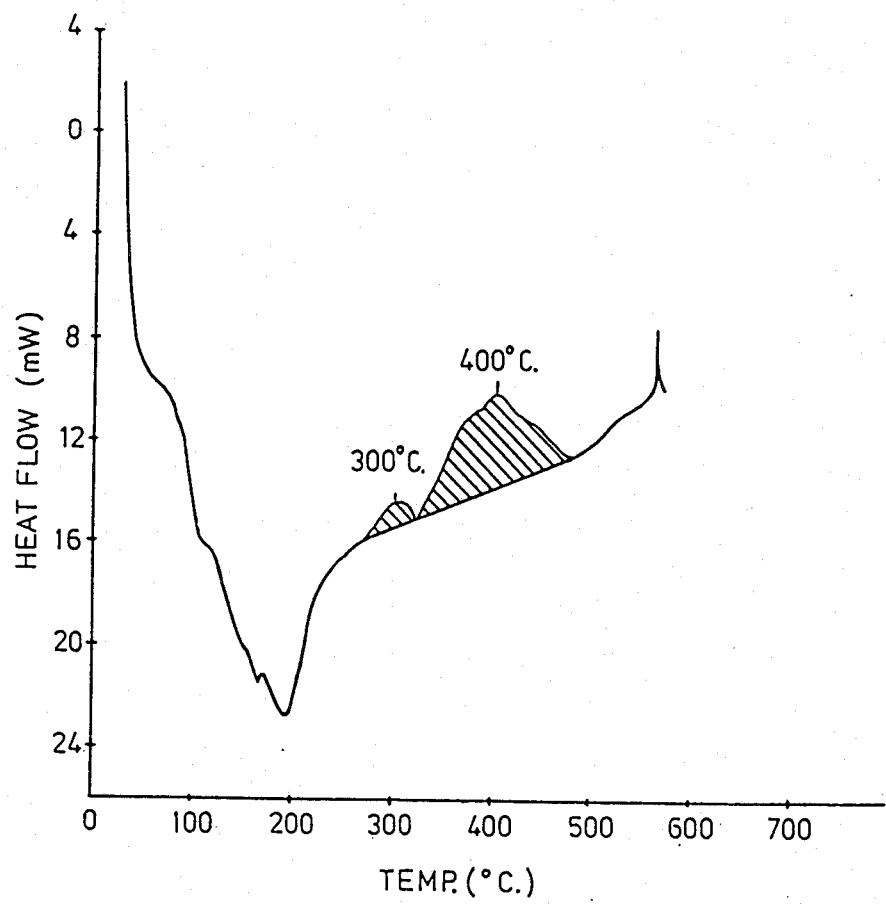
FIG. 5 is a thermogram showing the exothermic reaction of a sewage sludge, as determined by the differential scanning calorimeter of FIG. 4.

A partial cross-section through the operative portion of a differential scanning calorimeter is shown in FIG. 4. An accurately thermally calibrated calorimeter body 116 contains a sample chamber 118 which can be gas-purged as required via an inlet 120 through the lid 122. The chamber contains a pan support 124 on which is mounted reference pan 126 and sample pan 128, the latter receiving a sample of the sludge. The two pans sit on respective sensitive thermocouples 130 and 132 which are connected differentially to a suitable measuring, computing and graph-producing equipment. A standard sample of an inert reference material, such as a metal, silica or alumina, which will not undergo a phase change over the operative temperature range, is placed in the sample pan and the temperature of the entire calorimeter slowly and steadily raised, the instrument measuring the heat uptake of the material under test relative to the standard. Both exothermic and endothermic reactions can be monitored, and a thermogram for a typical sewage sludge is shown in FIG. 5, the abcissa being °C. while the ordinate is heat flow in mW per minute. It will be seen that it includes an initial endotherm from 100°–200° C., attributible to the residual moisture and generation of pyrolytic water, and two subsequent "exotherms" resulting from an exothermic reaction of the sludge, which extend over the ranges 270°–325° C. and 325°–480° C., with respective peaks at about 300° C. and 400° C. These are attributed to lipid and protein decomposition and subsequent catalysed conversion to oil, the areas of the exotherm portions corresponding to the heat of formation of the oils. It is found that the process should be operated in the reaction zone at least at the observed peak temperature of the second exotherm, since operation below this temperature is unlikely to give maximum yield. There appears to be no deleterious effect in operating within the exotherm area above the optimum value, except that of course higher energy losses will accompany such higher temperature operation without any apparent increase in yield.

The temperature required in the heating zone 16 will of course be that required for complete volatilization in the time taken to move the sludge through the zone, and a practical broad range is 250° C. to 350° C.

The temperature range required in the reaction zone is much wider and higher, from 280° C. to 600° C., with a preferred range of 325° C. to 450° C., the optimum value to be determined as described above.

It will be seen that the speedy and relatively inexpensive nature of the optimum temperature determination facilitates continuous operation with a sludge of variable composition, since the sludge can readily be tested at intervals of time frequent enough to permit maintenance of the average temperature at or close to the optimum for the variable sludge. Thus, the test procedure normally takes about 30 minutes. Under conditions of commercial operation sludge quality would not be expected to vary unduly during a normal eight-hour shift, so that testing once per shift would be appropriate.

Sludge Preparation

As indicated above sludges obtained directly from a sewage plant clarifier usually have about 2–4% by weight of solids, and this concentration should be increased to at least 90% before the sludge is fed to the heating chamber. This level of solids content is in commercial practice achieved by an appropriate combination of mechanical dewatering and thermal drying, the latter preferably employing the energy value of the char and the non-condensable gases. The remainder of the free water must be removed thermally. The thermal drying preferably is carried out as a pre-treatment step, since the water thus removed is of relatively high quality that can easily be recycled or discharged, whereas if removed during the volatilization it will be contaminated with the organic products. Values of 20%–45% are readily obtained by conventional dewatering apparatus. Sludge tends when dried to form large masses and should be comminuted before being fed to the heating zone. For commercial operation the comminution should achieve an average particle size below about 5–6 mm.

Effect Of Other Process Variables

No noticeable effect on yield was observed when the nitrogen purge was eliminated during processing (Run 23). However, the oil produced had a significantly lower viscosity. By contrast, a decrease in temperature ramping (from 10° to 5° C./min, Run 24) did result in decreases in both oil yield (from 20.8 to 16.3%) and thermal efficiency (from 81.9 to 76.9%). A possible explanation is that the oil precursors were volatilized and lost from the system prior to conversion.

Effect of Catalyst Addition

The chemical reactions producing the oil materials clearly are vapour phase exothermic reactions that are self-catalysed by the materials such as the clay, silt and heavy metals already present in the sludge solids, and in fact it is believed clear from Bayer's work acknowledged above that the catalysts are essential for the relatively high yields that are obtained at the relatively low process temperatures employed. Normal municipal sludges will almost always contain sufficient materials able to catalyse the reactions, but this may not be the case with sludges predominantly from a single source, e.g. those from a meat or vegetable processing plant, and in such circumstances artificial addition of catalytic material may be required for optimum production. As a test of the need for such additions with the sludges available, nickel, which is a hydrogenation catalyst, was added to sludge from source C sludge at values of 1,000, 2,000 and 10,000 $\mu g/g^{-1}$, and oil yield assessed; note however that the sludge already contained nickel at about 200 $\mu g/g^{-1}$ (Table 1). The data generated with the 10,000 $\mu g/g^{-1}$ addition is shown in Table 2 (Run 19) and there does not appear to be a significant improvement in oil yield, although thermal efficiency has increased. It is believed however, that this increase may be non-typical, since the calorific value of the nickel spiked sludge was about 10% lower than the unspiked sludge. Carbon and hydrogen balances do, however, indicate about a 10% increase in conversion to oil via the addition of 10,000 $\mu g/g^{-1}$ nickel. Each process will of course require separate evaluation as to whether there is sufficient improvement in process performance to warrant the addition of catalyst and, if so the amount and type to be added.

Effect of Gas/Solid Contact Time

An experimental dual reactor system was set up to evaluate whether extended gas and gas/solid contact time had an effect on product yield and quality. The second reactor, identical to the original one, was placed in a vertical position downstream of the first reactor.

Vapours from the first reactor were passed through this second reactor prior to condensation. The temperature in the second reactor was maintained at the optimum level. Three runs were conducted in this mode. The first used an empty reactor (Run 31) to assess the effect of increased gas residence time. The second and third runs (Run 31, 33) were conducted with the second reactor packed alternatively with char or copper (a decarboxylation catalyst), these last two runs establishing whether increased gas/catalyst contact time had any effects. The data in Table 2 indicate that increased gas/catalyst contact time had a dramatic effect on oil quality. In particular, it can be seen that oil viscosity was significantly reduced when extended gas/catalyst contact time was permitted. Under normal conditions the oil is solid at room temperature i.e., viscosity is more than 214 centistokes, and this was reduced to 39 centistokes when char was used as the catalyst and 31 centistokes when a copper catalyst was used. Although other runs did produce a liquid oil (e.g. Runs 2, 3, 4, 23, 19), the oils from the two stage reactor had the lowest viscosity. The reduced thermal efficiencies for the three runs were probably due to lack of complete product recovery. The results of these tests therefore indicate the importance of the particular process apparatus disclosed, in which the conveyor not only moves the solid material through the enclosure but ensures intimate mutual contact between the reacting solid and gaseous materials. The effect can also be controlled by control of the speed of the motor 22 via a motor control 134, itself under the control of the process controller 82.

Product Quality

The oils and chars were analysed at CANMET's Energy Research laboratory in Ottawa, Ontario, Canada by a battery of analyses commonly used to analyse synthetic fuels, the elemental analyses being shown in Table 3. This data indicates that, over the range of process conditions evaluated, the oil and char elemental analyses, with respect to possible end uses, are not significantly different. Thus, while process conditions can affect product yield, it appears that product quality, with respect to elemental analysis, is relatively insensitive to process fluctuations. Rough elemental balances indicate that 40–50% of the carbon and 30–40% of the hydrogen are converted to the oil. However, only 3–6% of the oxygen, 10–15% of the sulphur and 20–30% of the nitrogen remain in the oil. All of the phosphorous and 75–85% of the sulphur remain in the char. The oils were also analysed by sequential elution solvent chromatography to attempt to identify and quantify the constituents present. This analysis indicated that the oils contain approximately 26% saturated aliphatic hydrocarbons, less than 3% monoaromatics, 1.93% diaromatics and 0.49% polyaromatics. Polar compounds, most likely carboxylic acids, accounted for 28%, whereas 0.9% was basic, pyridine soluble matter, leaving about 39% unaccounted for. The breakdown of the aliphatic hydrocarbons is presented in Table 4 above.

TABLE 5

CONTINUOUS REACTOR RESULTS+

| | REACTOR CONDITIONS | | | | | OIL | | | | |
|---|---|---|---|---|---|---|---|---|---|---|
| Run No. | Temp (C.°) | Sludge Fd Rt (g/h) | SRT Solids Residence Time(Min) | Char Inv. (g) | Ratio Char Inv SFR | Gas Seal | Gas Path | Yield (%) | Cal. Value MJ/kg | Viscosity* (centistokes) |
| 34 | 350 | 750 | 8 | 51 | 0.068 | no | mixed flow | 18.53 | 27.88 | 160 |
| 35 | 450 | 750 | 8 | 54 | 0.072 | no | mixed flow | 29.71 | 31.12 | 72 |
| 36 | 500 | 750 | 8 | 53 | 0.071 | no | mixed flow | 28.16 | 34.01 | 34 |
| 37 | 450 | 750 | 28 | 201 | 0.268 | yes | counter current | 24.10 | 35.53 | 33 |
| 38 | 450 | 750 | 8 | 56 | 0.075 | no | 1st zone only | 24.46 | 30.06 | 110 |
| 39 | 450 | 750 | 8 | 55 | 0.073 | no | co-current | 27.96 | 33.20 | 73 |
| 40 | 450 | 1000 | 8 | 70 | 0.070 | yes | counter current | 26.75 | 31.04 | 82 |
| 41 | 450 | 500 | 20 | 88 | 0.176 | yes | counter current | 23.74 | 35.00 | 34 |

| | CHAR | | NCG | | | |
|---|---|---|---|---|---|---|
| Run No. | Yield (%) | Cal. Value MJ/kg | Yield (%) | Cal. Value MJ/kg | PYRO Water Yield | Thermal Effic'y (%) |
| 34 | 64.68 | 8.84 | 7.28 | 3.18 | 3.62 | 73.85 |
| 35 | 59.76 | 8.27 | 7.57 | 5.04 | 2.18 | 96.80 |
| 36 | 58.10 | 7.67 | 3.61 | 20.05 | 3.06 | 98.04 |
| 37 | 59.50 | 8.28 | 6.37 | 9.68 | 5.72 | 93.77 |
| 38 | 59.47 | 8.25 | 9.26 | 3.72 | 4.23 | 83.75 |
| 39 | 59.74 | 8.70 | 6.67 | 6.07 | 5.60 | 98.91 |
| 40 | 61.11 | 8.54 | 4.76 | 7.20 | 3.37 | 92.14 |
| 41 | 57.79 | 8.12 | 7.42 | 10.96 | 5.88 | 91.82 |

*Measured at 38° C. (ASTM standard) of Table 2 measurement at room temperature
+conducted using sludge from source 'C'

The sludge employed for the runs listed in Table 5 was obtained from source C of the batch experiments, and was of similar composition as shown in Table 1. The oil viscosities for the batch runs had been measured at room temperature (20°–25° C.), but those of Table 5 were measured at the ASTM standard value of 38° C. A typical run consisted of operation of the apparatus for about 1 hour without any material feed in order to obtain thermal equilibrium in the different parts at their different temperatures. It was then operated for 2–3 solids retention times (SRT-explained below) for the process to obtain equilibrium, and samples for analysis were taken during the period equivalent to the next 3-4 solids retention times when the process is in equilibrium. The solids retention time is the ratio between the char inventory (total char contents) of the reactor tube 10 and the equivalent char feed rate into the tube, the latter being deduced from the char yield of the feed material: thus $$SRT = \frac{\text{char inventory grams}}{\text{char feed rate grams per minute}} = \text{time minutes}$$

In Table 5 the non-condensible gases (NCG) were measured directly and not by difference calculation as in Table 2. The NCG produced from continuous runs had at least doubled the calorific value of that from the batch runs.

It will be noted that in Table 5 the yields of NCG and pyrolytic water are generally lower than with the batch tests of Table 2, while the yields of oil appear to be higher. However, the calorific values of the continuous-production oils are generally lower than for the batch production products, believed due to retention of water in the oils which will need to be removed, e.g. by centrifuging. The thermal efficiencies obtained with the continuous process (energy recovered from all of oil, char, NCG, etc) are generally higher than with the batch processes, which is to be expected.

The effect of process temperature is illustrated by runs 34-36. The optimum results were obtained with run 35 (450° C.). Run 34 was operated at 350° C. resulting in strongly reduced oil yield from 29.71% to 18.53%, and correspondingly reduced thermal efficiency from 96.8% to 73.85%. It also resulted in incomplete volatilisation of oil precursors, as evidenced by the higher char yield and higher char calorific value. Operation at 500° C. (Run 36) had relatively little effect on yield (down to 28.16%) and thermal efficiency (up to 98.04%), and as expected oil viscosity decreased from 160 CS at 350° C. to 72 CS at 450° C. and 34 at 500° C. Theoretical calculation shows that the tube 10 requires a minimum char inventory of 63 grams for the baffle seal 35 to be effective, and it will be noted that for all three runs it was below this value. Quite large gas flows can occur through relatively small gaps and although the apparatus was operated in counter-current mode it is doubtful if the seal was fully operative and the reaction is therefore designated as a "mixed flow" operation, namely a combination of counter-current, co-current and direct discharge after the heating zone.

A comparison of runs 37, 38 and 39 illustrates the effect of gas/catalyst contact and gas contact time. Run 37 has ample char inventory to ensure the conveyor seal is operative and the process is truly counter-current, while run 38 was operated by withdrawing all the evolved gas from the heating zone 16 and condensing it directly. Run 39 was operated with the seal baffles 35 removed and gas openings 54 and 76 plugged, with inlet 60 now acting as an outlet, so that the process was truly co-current. These runs show that extended and uniform contact of the oil precursors produced in the heating zone with the char catalyst gives an improved product of reduced viscosity. Thus, optimum counter-current run 37 produced oil of viscosity 33CS compared to oil of viscosity 73CS for co-current operation (Run 39) and oil of viscosity 110CS for reaction in the heating zone only (Run 38). The NCG yield from run 38 is higher (9.26% compared to 6.37%) but of lower calorific value (3.72 MJ/kg compared to 9.68 MJ/kg) than that obtained in the optimum run 37, and it is usually preferred as described above to minimise NCG if possible. The NCG yields of Runs 37 and 39 are similar (6.37 and 6.67% respectively) but the NCG from run 37 is of higher calorific value (9.68 compared to 6.07).

The quantity of vapour available for reaction to produce oil of course increases with the feed rate of sludge to the apparatus, while the quantity of available catalyst increases with increase of char inventory. A useful ratio is the char inventory divided by the sludge feed rate (SFR), and the oil viscosity is found to decrease as this ratio increases, this effect being illustrated by comparing the results from runs 37, 40 and 41. An increase of the ratio from 0.070 (Run 40) to 0.176 (Run 41) is accompanied by a decrease in viscosity from 82 to 34, while an increase to 0.268 (Run 37) is only accompanied by a minor decrease to 33. This shows that the ratio should be sufficiently high to ensure adequate and uniform char/gas contact.

These results also show the feasibility of adjusting the distribution of the energy yield among the three products oil, char, NCG to suit the operating conditions of the apparatus and to maximise the product most required by local markets.

Environmental Considerations

The environmental considerations that need to be addressed include:

(i) process emissions (both aqueous and atmospheric such as the NCG and pyrolytic water); and (ii) the impact of product end use (oil, char, NCG).

At full scale the NCG may be combusted with the char to provide the heat needed to drive the process and render it as autogenic as possible. Metal balances indicate that all the metals remain in the char and, therefore, burning will produce an ash very similar to that generated via direct sludge incineration, and conventional air pollution control technology will be adequate.

The pyrolytic water produced contains significant quantities of biodegradable material (approximately 10-15% organic carbon, essentially low molecular weight acids, etc.). Based on preliminary analysis, the concentrations of U.S. EPA priority pollutants in this stream are very low. Consequently, this stream could potentially be treated by high rate anaerobic processes. It also contains sufficient organic carbon to render it suitable for direct combustion. Metal analyses of the oil indicate low levels (<5 $\mu$g/g) for priority pollutant metals such as copper, zinc, chromium, vanadium, lead and nickel. The least valuable end-use for the oil is to burn it as a fuel oil replacement and no undue environmental concerns need be expected in this regard. However, the potential exists to increase end-use value by upgrading e.g. to a transportation fuel.

In general, at this point in time, no environmental constraints have been identified which would limit exploitation of the processes and apparatus of the invention.

There are a number of reasons why the conversion of organic sludge components to synthetic liquid fuels is more attractive at full scale than the other processes mentioned. The major reason is that it produces a valuable, diminishing resource, which can readily be stored and transported, in contrast to the other processes, which produce either a combustible gas or steam, both of which present storage and transportation problems. Furthermore, the process is simple and not prone to upset as are other biological conversion processes. A significant advantage is that most of the properties which have historically deemed sludge "undesirable", are now a prerequisite for success. Metals, especially copper, are essential to catalyse the oil-producing reaction; high organic (volatile) concentrations are desirable and sludge sources should be close to large industrial centres. In addition, the process converts up to 95% of the carbon in the sludge to liquid and solid fuels. By contrast, for example, anaerobic digestion normally only converts about 25% of the carbon to methane. Finally, potential pathogen and viral problems associated with sludge are eliminated by the necessary heat treatment and ultimate solid disposal problems are limited to the ash from utilization of the char.

Recently concern has been expressed regarding the toxic organic compounds which accumulate in sewage sludge, and it has been reported that pesticides, polynuclear aromatics (PNA's) and phthalates are some of the most frequently observed toxic organics in sludge. While the presence of these compounds may have detrimental effects on many sludge disposal options, their presence is not likely to affect a synthetic oil production process such as that of the present invention. In fact, naturally occurring crude oil has been shown to contain significant quantities of these toxic organic compounds, including PNA's. Those organics which are not transferred to the synthetic oil will remain in the char, and should be oxidized during its combustion. There is also currently widespread concern with respect to acid rain, which is, in part, caused by the oxides of sulphur and nitrogen generated from combustion of hydrocarbons. Sludge derived oil has been shown to contain 0.05–1.2% sulphur, which compares favourably with the best quality natural crude oils. The nitrogen content of sludge derived oil is somewhat higher than natural crude oil. Both of these components can be readily removed prior to the conversion by scrubbing in the gas cleaner 58. It, therefore, appears that from a quality viewpoint, the utility of sludge derived oil would not be limited.

Exploitation of this sludge conversion process to its potential implies a consequent change in wastewater treatment philosophy. Systems which maximize sludge production such as contact stabilization, high rate activated sludge and the Deep Shaft process are to be favoured. Raw sludge would only have to be dewatered prior to processing. Furthermore, since metals are required to catalyse the reaction, pretreatment requirements for industrial effluents could be relaxed. The conversion process operates at a temperature low enough to ensure that the metals would remain in the char. Obviously, the ash from burning of such a char would be very high in metals, but because its volume will be significantly less than the original sludge, solidification or landfilling does not create a significant economic penalty.

We claim:

1. Process for the conversion of sludge to produce oil products and sludge residue comprising the steps of:
    (a) converting the sludge to the form of dried sludge;
    (b) heating the dried sludge in a heating zone in the absence of oxygen to a temperature of at least 250° C. for the volatilization of organic products therefrom, resulting in heating zone gaseous organic products and sludge residue;
    (c) removing the said gaseous organic products and the sludge residue from the heating zone and delivering them to a reaction zone;
    (d) heating the reaction zone to establish therein a reaction temperature of from 280° C. to 600° C.;
    (e) contacting the sludge residue in the reaction zone with the heating zone gaseous organic products in the absence of oxygen at the reaction temperature with repeated intimate gas/solid contact to cause reactions of the heating zone gaseous organic products catalysed by the heated sludge residue resulting in reaction zone gaseous products containing oil products;
    (f) removing the reaction zone gaseous products of step e from the reaction zone and separating at least the oil products therefrom.

2. Process as claimed in claim 1, wherein in step (e) the sludge residue and the heating zone gaseous organic products are moved in the reaction zone countercurrent relative to one another to effect the required gas/solid contact between them.

3. Process as claimed in claim 1, wherein in step (b) the dried sludge and the heating zone gaseous organic products produced therefrom move through the heating zone cocurrent relative to one another.

4. Process as claimed in claim 1, wherein in step (e) the sludge residue is in comminuted form and is conveyed through the reaction zone by a lifting conveyor which lifts the sludge residue and permits it to fall under gravity through the heating zone gaseous organic products in the zone to effect the required gas/solid contact between them.

5. Process as claimed in claim 1, wherein prior to step (a) the sludge is mechanically dewatered to a solids content from 20% to 45% by weight.

6. Process as claimed in claim 5, wherein the dewatered sludge is thermally dried to a solids content of at least 90% by weight.

7. Process as claimed in claim 1, wherein the dried sludge in the heating zone is heated to a temperature in the range 250° C. to 350° C.

8. Process as claimed in claim 1, wherein the solid material of the dried sludge of step (a) is comminuted before its entry into the heating zone.

9. Process as claimed in claim 1, wherein the dried sludge continuously enters the heating zone and is continuously conveyed therethrough by a conveyor within the heating zone, the said heating zone gaseous organic products are continuously removed therefrom; the sludge residue from step (b) is continuously conveyed by a conveyor from the heating zone to the reaction zone and is continuously conveyed by a conveyor through the reaction zone; and the solid and gaseous products resulting from the reaction taking place in the reaction zone are continuously discharged from the reaction zone via respective reaction zone solid and gaseous products separate discharge outlets; and wherein the said heating zone gaseous organic products are continuously fed into the reaction zone adjacent the reaction zone solid products discharge outlet to move countercurrent to the solid products in the reaction zone.

10. Process as claimed in claim 1, and including the step of treating the heating zone gaseous organic products to remove unwanted constituents comprising sulfur, nitrogen or mixture thereof, before they are fed to the reaction zone.

11. Process as claimed in claim 1, and including the step of testing a sample of the dried sludge fed to the heating zone in a differential scanning calorimeter and obtaining from the test a thermogram indicating the temperature range of the reaction that is characteristic of the production of said oil products, obtaining from the thermogram the optimum temperature range for the reaction zone for the maximum yield of said oil products, and adjusting the temperature of the reaction zone to be within the thus obtained optimum temperature range. sludge.

12. Process as claimed in claim 1, wherein the sludge is sewage sludge comprising from 50 to 88% by weight of activated sludge.

13. Process for the optimisation of the production of oil products from dried sludge which has been heated to volatilise organic products therefrom to result in gaseous organic products and dried sludge residue, including the steps of:

(a) heating the dried sludge residue and the gaseous organic products obtained from the dried sludge in a reaction zone in the absence of oxygen to a temperature of from 280° C. to 600° C. for the establishment of an exothermic vapour-phase, reaction between the components of the gaseous organic products, which reaction is catalysed by catalytic components contained in the sludge residue, whereby oil products are formed;

(b) testing a sample of the dried sludge from which the sludge residue and the gaseous organic products have been obtained in a differential scanning calorimeter and producing as a result of the test a thermogram indicating the temperature range of the exothermic reaction characteristic of the production of the oil products;

(c) obtaining from the thermogram the optimum reaction temperature range for the maximum yield of the oil products from the exothermic reaction; and (d) adjusting the temperature of the resction zone to be within the thus obtained optimum temperature range.

14. A process as claimed in claim 13, wherein for continuous operation with a dried sludge of variable composition, the process further comprise the steps of:

(e) testing the dried sludge at intervals of time by application of steps (b) and (c), and (f) adjusting the reaction temperature in accordance with step (d), the said intervals of time being frequent enough to maintain an average reaction temperature at or close to the optimum reaction temperature for the variable composition dried sludge.

* * * * *

UNITED STATES PATENT AND TRADEMARK OFFICE
CERTIFICATE OF CORRECTION

PATENT NO. : 4,618,735
DATED : October 21, 1986
INVENTOR(S) : Trevor R. BRIDLE and Herbert W. CAMPBELL It is certified that error appears in the above-identified patent and that said Letters Patent are hereby corrected as shown below:

On the cover page, the name of the Assignee is:

"Canadian Patents and Development Limited /Société des Brevets et d'Exploitation Limitée"

Column 2, Line 54: " 1 aus" should be --Q̈1 aus--

Column 5, Line 66: After "testing" insert --a--

Column 20, Line 13: "prbducts" should be --products--

Column 21, Line 12: After "range." delete "sludge."

Column 22, Line 14: "resction" should be --reaction--

Signed and Sealed this

Seventh Day of April, 1987

Attest:

DONALD J. QUIGG

Attesting Officer

Commissioner of Patents and Trademarks